United States Patent
Shihara et al.

(10) Patent No.: US 7,088,662 B2
(45) Date of Patent: Aug. 8, 2006

(54) OPTICAL DISC DRIVE AND METHOD FOR CONTROLLING THE SAME

(75) Inventors: Tetsuya Shihara, Kadoma (JP); Tatsuya Takeuchi, Yawata (JP); Kenji Fujiune, Takatsuki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 371 days.

(21) Appl. No.: 10/488,370

(22) PCT Filed: Aug. 1, 2003

(86) PCT No.: PCT/JP03/09842

§ 371 (c)(1),
(2), (4) Date: Mar. 2, 2004

(87) PCT Pub. No.: WO2004/038710

PCT Pub. Date: May 6, 2004

(65) Prior Publication Data

US 2004/0246832 A1 Dec. 9, 2004

(30) Foreign Application Priority Data

Oct. 23, 2002 (JP) .............................. 2002-308228

(51) Int. Cl.
*G11B 7/007* (2006.01)
(52) U.S. Cl. .................................. 369/53.23
(58) Field of Classification Search ............. 369/53.23, 369/53.21
See application file for complete search history.

(56) References Cited

U.S. PATENT DOCUMENTS

| 4,999,827 | A | * | 3/1991 | Miyaoka | 369/44.18 |
| 5,499,229 | A | * | 3/1996 | Murakami et al. | 369/111 |
| 5,568,461 | A | | 10/1996 | Nishiuchi et al. | |
| 6,181,657 | B1 | * | 1/2001 | Kuroda et al. | 369/59.1 |
| 6,295,260 | B1 | | 9/2001 | Shihara et al. | |
| 7,027,370 | B1 | * | 4/2006 | Adachi et al. | 369/47.53 |

FOREIGN PATENT DOCUMENTS

| EP | 0 745 981 A2 | 12/1996 |
| EP | 0 759 609 A2 | 2/1997 |
| JP | 3 144929 A | 6/1991 |
| JP | 07-085478 A | 3/1995 |

* cited by examiner

*Primary Examiner*—Gautam R. Patel
(74) *Attorney, Agent, or Firm*—Akin Gump Strauss Hauer & Feld, LLP

(57) ABSTRACT

An optical disc drive according to the present invention can read and write data from/on an optical disc 100 including record tracks to write data thereon and guide tracks for guiding a light beam 40. The drive includes: an optical pickup 101 with a converging optical system to focus the light beam 40 and form a spot thereof on the optical disc 100 for reading or writing the data; a tracking control section for controlling the converging optical system of the optical pickup 101 such that the light beam spot 40 follows a selected track on the optical disc 100 rotating; and a control unit 35 for operating the tracking control section in a first mode or in a second mode. In the first mode, the tracking control section makes the light beam spot 40 follow the recording tracks. In the second mode, the tracking control section makes the light beam spot 40 follow the guide tracks.

23 Claims, 11 Drawing Sheets

OPTICAL DISC DRIVE AND METHOD FOR CONTROLLING THE SAME

CROSS-REFERENCE TO RELATED APPLICATIONS

This application is a Section 371 of International Application No. PCT/JP03/09842, filed Aug. 1, 2003, the disclosure of which is incorporated herein by reference.

TECHNICAL FIELD

The present invention relates to an optical disc drive for use to read and/or write data from/on an optical disc. The optical disc drive of the present invention is typically used as an optical drive for computers, for example, but may also be used as an optical disk player (e.g., a CD player or a DVD player) or an optical disc recorder in audiovisual appliances. The optical disc dirve of the present invention can be used for various sorts of electronic apparatus such as a home server, a video recorder, and a notebook computer.

BACKGROUND ART

Recently, optical discs are used extensively as storage media for computers and audiovisual appliances. Various formats have been proposed for optical discs so far. For example, there are read-only optical discs such as CD-ROM and DVD-ROM, write-once optical discs such as CD-R and DVD-R, and rewritable optical discs such as CD-RW, DVD-RW and DVD-RAM.

Among these various types of optical discs, CD-R, DVD-R, CD-RW and DVD-RW each include a substrate, on which lands and grooves are provided spirally, and a recording film that has been deposited on the substrate. In the optical discs of these types, data is written on tracks that are defined on the grooves.

In the write-once optical discs, the recording film thereof is made of an organic dye material. In the rewritable optical discs on the other hand, the recording film thereof is made of a phase change material. The organic dye recording film absorbs a pulsed write laser radiation, emitted from the light source of an optical disc drive, thereby causing an irreversible structural change. On the other hand, the phase-change recording film is melted when exposed to the write laser radiation, and then solidified. In this case, by adjusting the intensity and the pulse width of the write laser radiation, amorphous recording marks and crystalline spaces can be defined in the phase-change recording film. In the rewritable optical discs, the phase change of the recording film is reversible, and therefore, the recording marks are rewritable.

In any case, in writing data on an optical disc, the recording film thereof needs to be irradiated with a laser radiation that has a power that is high enough to change the structure or optical property (e.g., reflectivity, in particular) of the recording film locally. On the other hand, in reading data from an optical disc, the recording film thereof also needs to be irradiated with a laser radiation so as to detect a variation in reflectance. In this case, however, the reflectivity of the recording film should not be changed due to the exposure to the laser radiation. For that reason, the read laser radiation normally has a much smaller power than the write laser radiation.

Also, the wavelength of a read/write laser radiation changes according to the specifications to which a given optical disc conforms. For example, the read/write laser radiation for a CD has a wavelength of about 780 nm, while the read/write laser radiation for a DVD has a wavelength of about 650 nm. Generally speaking, the storage density of an optical disc depends on the beam spot size of the laser radiation. Thus, to further increase the storage density, the wavelength of the laser radiation needs to be even shorter. For that purpose, a Blu-Ray disc, which is known as a next-generation optical disc to replace DVDs in the near future, uses a violet laser radiation with a wavelength of about 405 nm.

Also, to increase the storage density and storage capacity of an optical disc, the recording film thereof needs to exhibit increased sensitivity so as to cause a structural change or phase change responsive to smaller optical energy applied. Furthermore, to perform a read or write operation on an optical disc at a higher rate, the optical disc needs to be rotated at a higher velocity. Thus, the light beam should have relatively high power not just during data writing but also during data reading.

However, as such an optical disc with an increased sensitivity is read numerous times, the recording film thereof should gradually deteriorate due to the repetitive exposure to the read laser radiation. Then, the quality of the resultant readout signal should decrease, too. Such deterioration will be referred to herein as "weak-radiation-induced deterioration". This weak-radiation-induced deterioration is particularly significant in a recording film made of an organic dye material, but is sometimes observed in a recording film made of a phase change material, too.

Methods for avoiding such weak-radiation-induced deterioration are proposed in Japanese Laid-Open Publication No. 7-85478 and in U.S. Pat. No. 6,295,260, for example. The optical disc drive disclosed in U.S. Pat. No. 6,295,260 adaptively changes the power of the read laser radiation according to the type of an optical disc to be read. For example, in reading a CD-R in which the weak-radiation-induced deterioration occurs particularly frequently, this optical disc drive minimizes the laser radiation power.

In such an optical disc drive, however, when the power of the read laser radiation is lowered, the quality of the resultant readout signal will decrease. Also, if the laser power is decreased excessively, then the tracking error signal is detected with too low sensitivity to stabilize the tracking operation sufficiently.

In order to overcome the problems described above, preferred embodiments of the present invention provide an optical disc drive, which can perform a read operation constantly by minimizing the weak-radiation-induced deterioration of the recording film, and also provide a method for controlling such an optical disc drive.

DISCLOSURE OF INVENTION

An optical disc drive according to a preferred embodiment of the present invention is preferably used to read and write data from/on an optical disc, which preferably includes recording tracks to write data thereon and guide tracks for guiding a light beam. The optical disc drive preferably includes an optical pickup, a tracking control section and a control unit. The optical pickup preferably includes a converging optical system, which is used to focus the light beam, and form a spot of the light beam, on the optical disc for the purpose of reading or writing the data from/on the optical disc. The tracking control section preferably controls the converging optical system of the optical pickup such that the spot of the light beam follows a selected one of the tracks on the optical disc rotating. The control unit preferably selectively operates the tracking control section either in a first mode or in a second mode. In the first mode, the tracking control section preferably makes the light beam spot follow the recording tracks. In the second mode on the other hand, the tracking control section preferably makes the light beam spot follow the guide tracks.

In one preferred embodiment of the present invention, the optical disc preferably includes lands and grooves that extend spirally. The recording tracks are preferably defined on the lands or the grooves and the guide tracks are preferably defined on the grooves or the lands.

In another preferred embodiment, while the tracking control section is operating in the first mode, the optical disc drive preferably reads or writes the data from/on the optical disc. On the other hand, while the tracking control section is operating in the second mode, the optical disc drive preferably neither reads nor writes the data from/on the optical disc.

In still another preferred embodiment, the tracking control section is preferably switched from the first mode into the second mode by changing control polarity of the tracking control section.

In this particular preferred embodiment, the control polarity of the tracking control section is preferably changed by switching the polarity of a signal to be input to the tracking control section.

In yet another preferred embodiment, the optical pickup preferably further includes: a photodetector, which receives the light beam that has been reflected from the optical disc and which outputs an electric signal representing an intensity distribution of the light beam; and an actuator for driving the converging optical system. The tracking control section preferably includes: means for generating a tracking error signal in accordance with the electric signal that has been supplied from the photodetector; and a driver for driving the actuator of the optical pickup in response to a signal output from the control unit.

In this particular preferred embodiment, the control unit preferably controls switching of the tracking control section between the first and second modes in accordance with an operation state of the optical disc drive.

More particularly, the control unit preferably inverts the polarity of an output signal of the means for generating the tracking error signal or the polarity of an output signal of the driver, thereby switching the tracking control section between the first and second modes.

Alternatively or additionally, at least a portion of the control unit may function as a state decision section for determining whether or not the optical disc drive is performing a read/write operation. In accordance with a decision that has been made by the state decision section, the control unit may switch the tracking control section between the first and second modes.

In yet another preferred embodiment, the control unit may be a digital signal processor.

In yet another preferred embodiment, the optical disc drive may further include a standby interval clock for measuring the length of a standby interval in which the tracking control section is operating in the first mode but the optical disc drive has already stopped reading or writing the data. When the length of the standby interval that has been measured by the standby interval clock exceeds a predefined value, the tracking control section preferably switches from the first mode into the second mode.

In this particular preferred embodiment, the predefined value is preferably at least equal to the amount of time it takes for the optical disc to make one rotation and is preferably shorter than the amount of time it takes to read or write the data from/on remaining ones of the recording tracks on the optical disc.

A control method according to a preferred embodiment of the present invention is a method for controlling an optical disc drive that can read and write data from/on an optical disc. The optical disc preferably includes recording tracks to write data thereon and guide tracks for guiding a light beam. The optical disc drive preferably includes an optical pickup, a tracking control section and a control unit. The optical pickup preferably includes a converging optical system, which is preferably used to focus the light beam, and form a spot of the light beam, on the optical disc for the purpose of reading or writing the data from/on the optical disc. The tracking control section preferably controls the converging optical system of the optical pickup such that the spot of the light beam follows a selected one of the tracks on the optical disc rotating. The control unit preferably operates the tracking control section in a selected mode. The control method preferably includes the steps of: (a) controlling the tracking control section such that the light beam spot follows the recording tracks; (b) controlling the tracking control section such that the light beam spot follows the guide tracks; and (c) switching modes of operation of the tracking control section.

In one preferred embodiment of the present invention, the optical disc preferably includes lands and grooves that extend spirally, the recording tracks are preferably defined on the lands or the grooves, and the guide tracks are preferably defined on the grooves or the lands.

In another preferred embodiment, the step (a) preferably includes the step of reading or writing the data from/on the optical disc, and the step (b) preferably includes the step of reading or writing no data from/on the optical disc.

In still another preferred embodiment, the step (c) preferably includes the step of changing control polarity of the tracking control section.

In this particular preferred embodiment, the step of changing the control polarity of the tracking control section preferably includes the step of switching the polarity of a signal to be input to the tracking control section.

In yet another preferred embodiment, the optical pickup preferably further includes: a photodetector, which receives the light beam that has been reflected from the optical disc and which outputs an electric signal representing an intensity distribution of the light beam; and an actuator for driving the converging optical system. The tracking control section preferably includes: means for generating a tracking error signal in accordance with the electric signal that has been supplied from the photodetector; and a driver for driving the actuator of the optical pickup in response to a signal output from the control unit.

In this particular preferred embodiment, the step (c) preferably includes the step of getting the control polarity of the tracking control section inverted by the control unit in accordance with an operation state of the optical disc drive.

More particularly, the step (c) preferably includes the step of inverting the polarity of an output signal of the means for generating the tracking error signal or the polarity of an output signal of the driver.

In yet another preferred embodiment, the step (a) preferably includes the step of measuring the length of a standby interval in which the optical disc drive has already stopped reading or writing the data. The step (c) is preferably carried out when the length of the standby interval exceeds a predefined value.

In this particular preferred embodiment, the predefined value is preferably at least equal to the amount of time it takes for the optical disc to make one rotation and is preferably shorter than the amount of time it takes to read or write the data from/on remaining ones of the recording tracks on the optical disc.

An electronic apparatus according to a preferred embodiment of the present invention comprises an optical disc drive for use to read and write data from/on an optical disc, the optical disc including recording tracks to write data thereon and guide tracks for guiding a light beam. The optical disc drive comprisies: an optical pickup including a converging optical system, the converging optical system being used to focus the light beam, and form a spot of the light beam, on the optical disc for the purpose of reading or writing the data from/on the optical disc; a tracking control section for controlling the converging optical system of the optical pickup such that the spot of the light beam follows a selected one of the tracks on the optical disc rotating; and a control unit for selectively operating the tracking control section either in a first mode or in a second mode, wherein in the first mode, the tracking control section makes the light beam spot follow the recording tracks, and wherein in the second mode, the tracking control section makes the light beam spot follow the guide tracks.

Other features, elements, processes, steps, characteristics and advantages of the present invention will become more apparent from the following detailed description of preferred embodiments of the present invention with reference to the attached drawings.

BRIEF DESCRIPTION OF DRAWINGS

FIG. 8 shows how the tracking error signal TE represents the shift of a light beam spot 60 from a target recording track 600, wherein:

Figure 8:
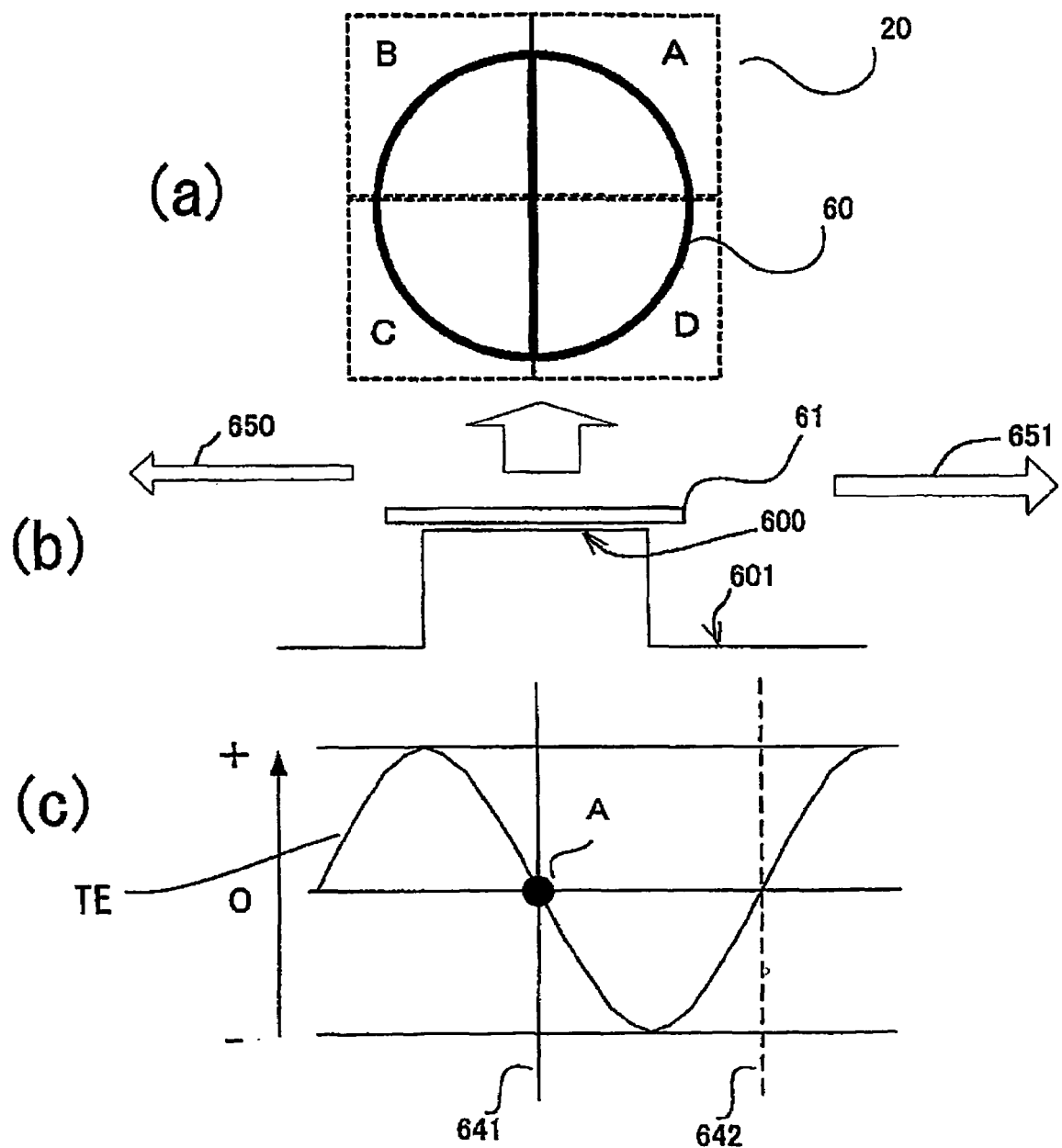

Portion (a) of FIG. 8 shows the light beam spot 60 on the photodetector 20;

Portion (b) of FIG. 8 illustrates a cross section of the recording track 600 and a guide track 601; and Portion (c) of FIG. 8 shows the waveform of the tracking error signal TE.

Figure 9:
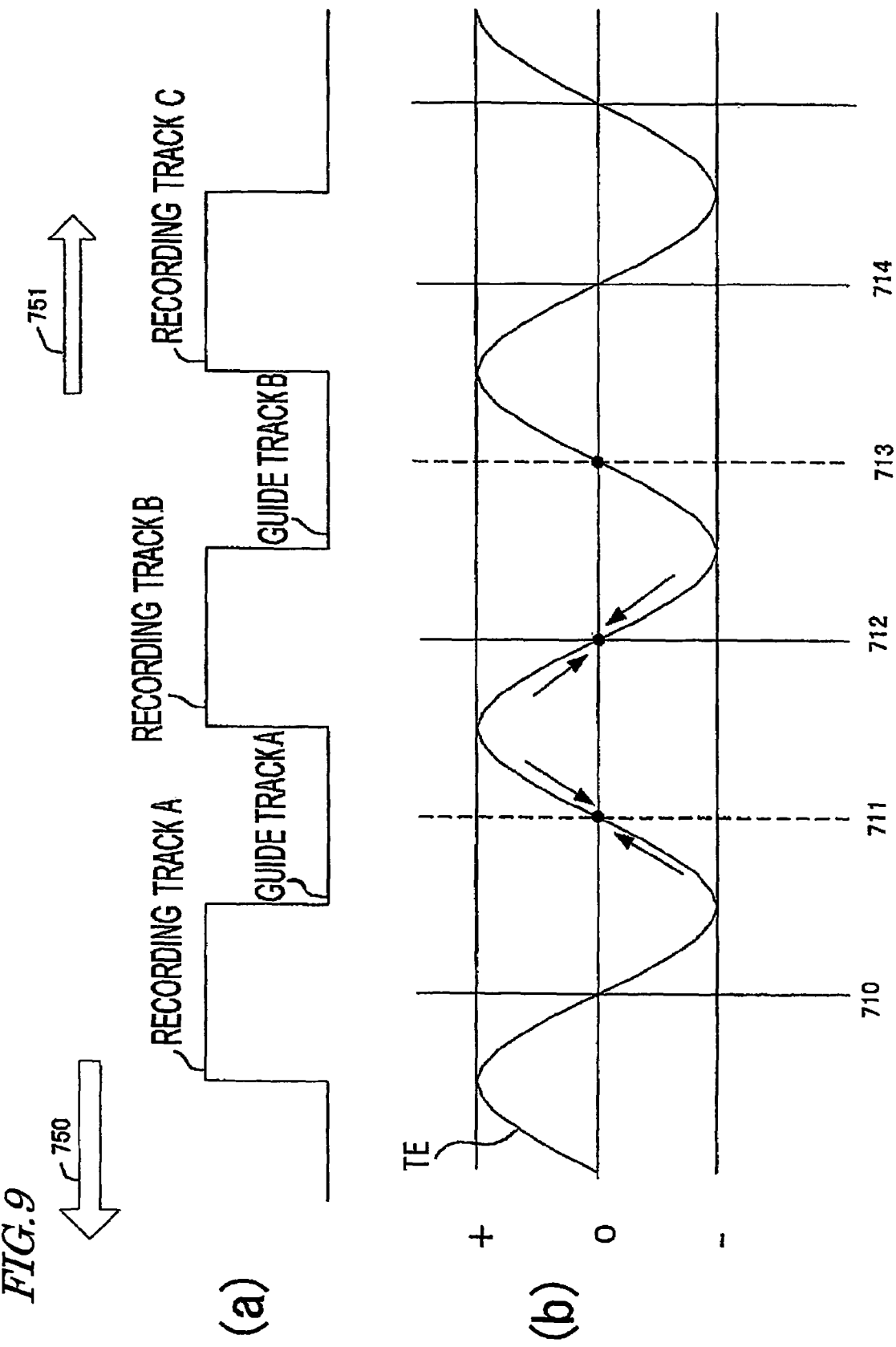

FIG. 9 shows the waveform of a tracking error signal to be obtained while the light beam spot on the optical disc 100 is going across a number of tracks.

Figure 10:
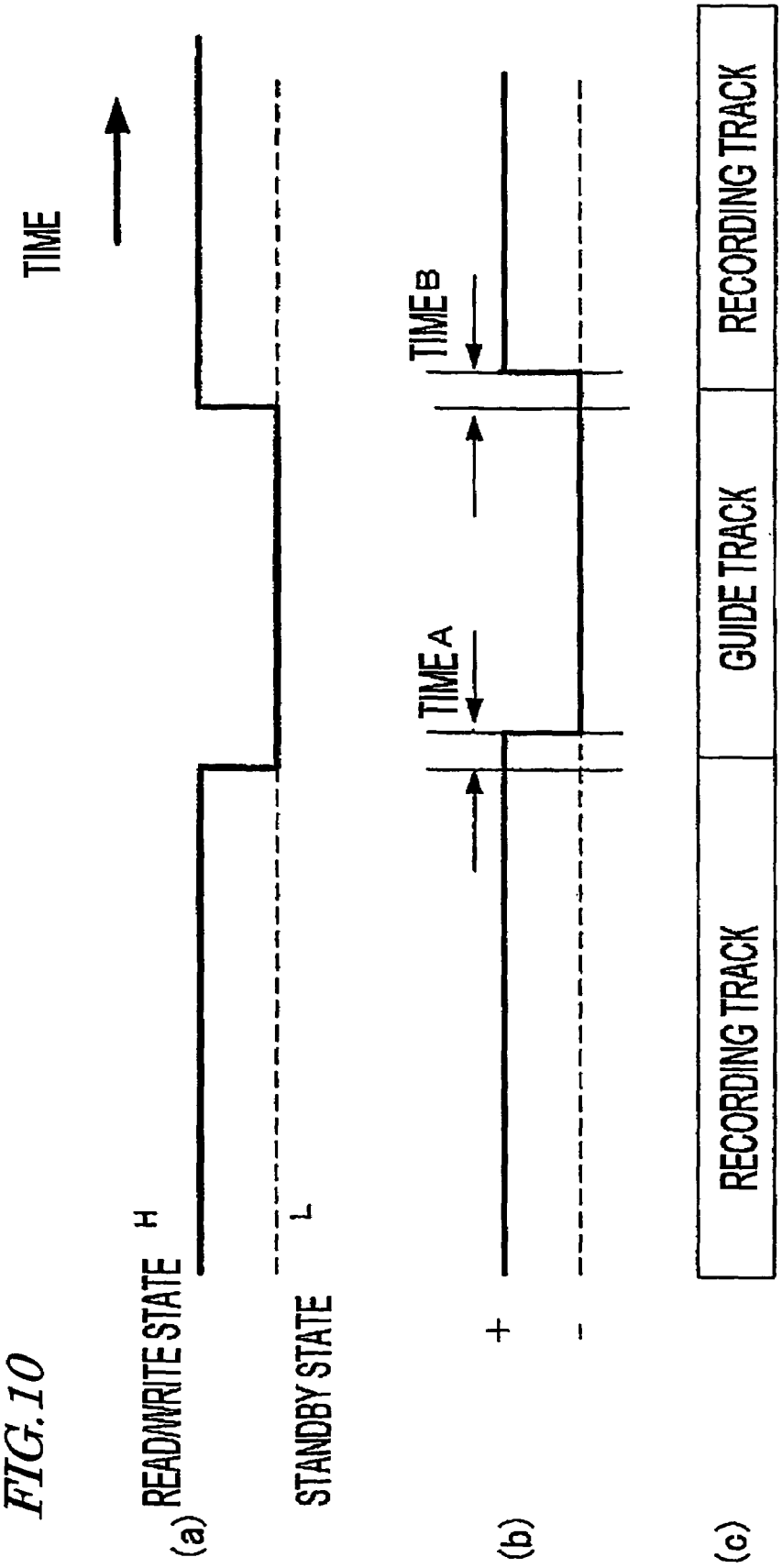

FIG. 10 is a timing diagram showing how the tracking control modes are switched in the first preferred embodiment, wherein:

Portion (a) shows how the output of the state decision section changes with time;

Portion (b) shows how the polarity of the tracking control changes with time; and Portion (c) shows how the track to be scanned changes with time.

Figure 11:
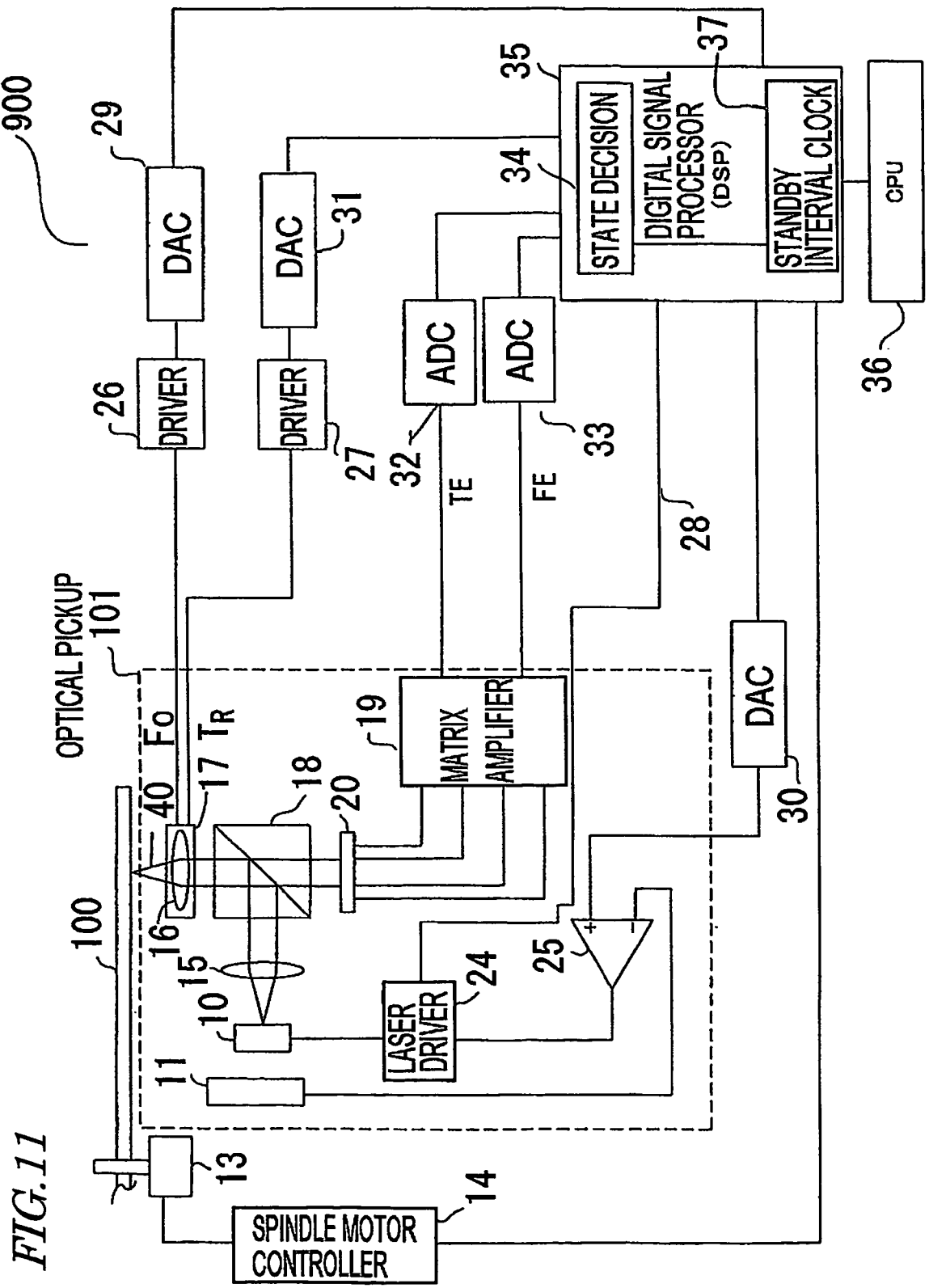

FIG. 11 is a block diagram showing a configuration for an optical disc drive according to a second specific preferred embodiment of the present invention.

Figure 12:
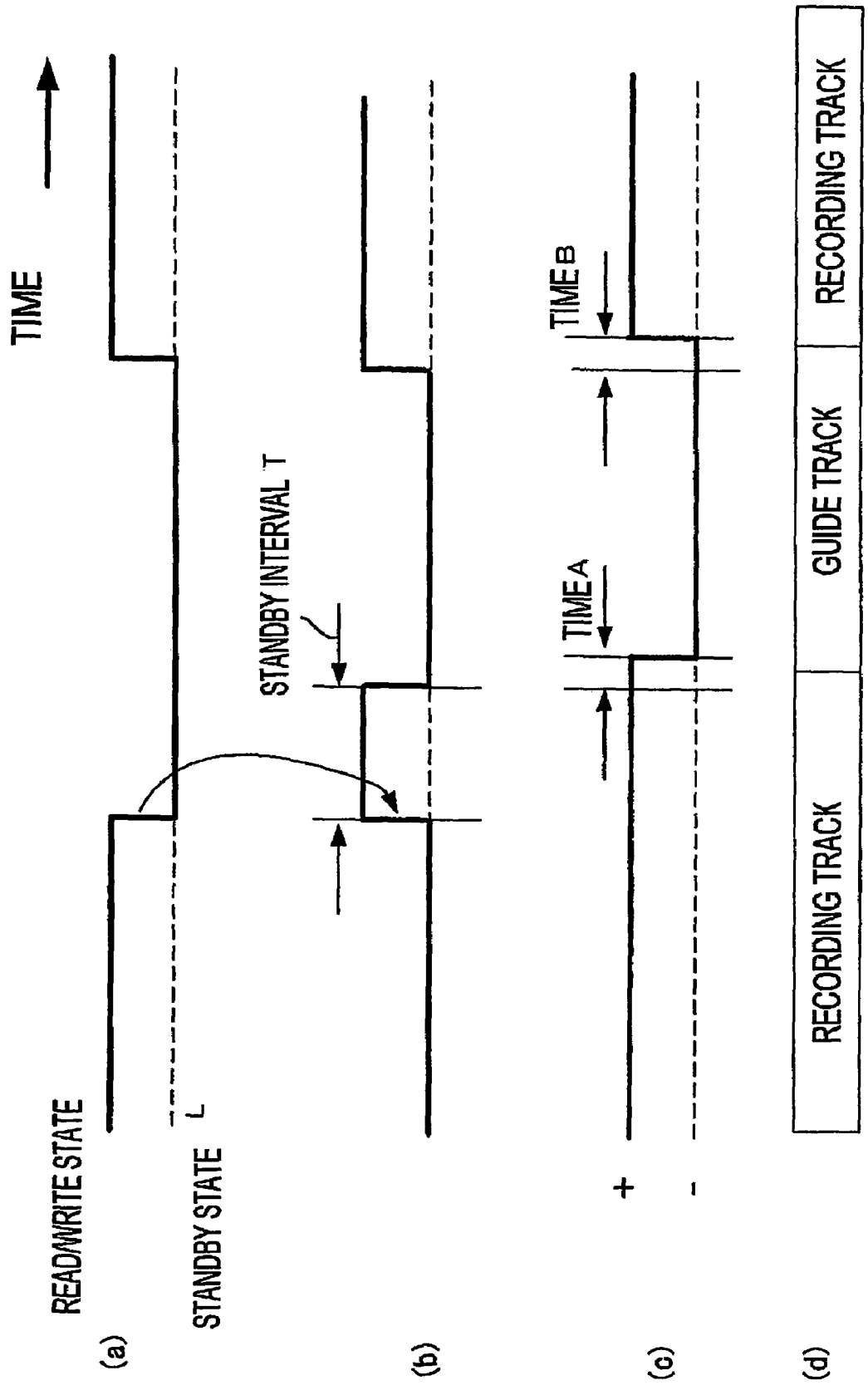

FIG. 12 is a timing diagram showing how the tracking control modes are switched in the second preferred embodiment, wherein:

Portion (a) shows how the output of the state decision section changes with time;

Portion (b) shows how the output of the standby interval clock changes with time;

Portion (c) shows how the polarity of the tracking control changes with time; and Portion (d) shows how the track to be scanned changes with time.

Figure 13:
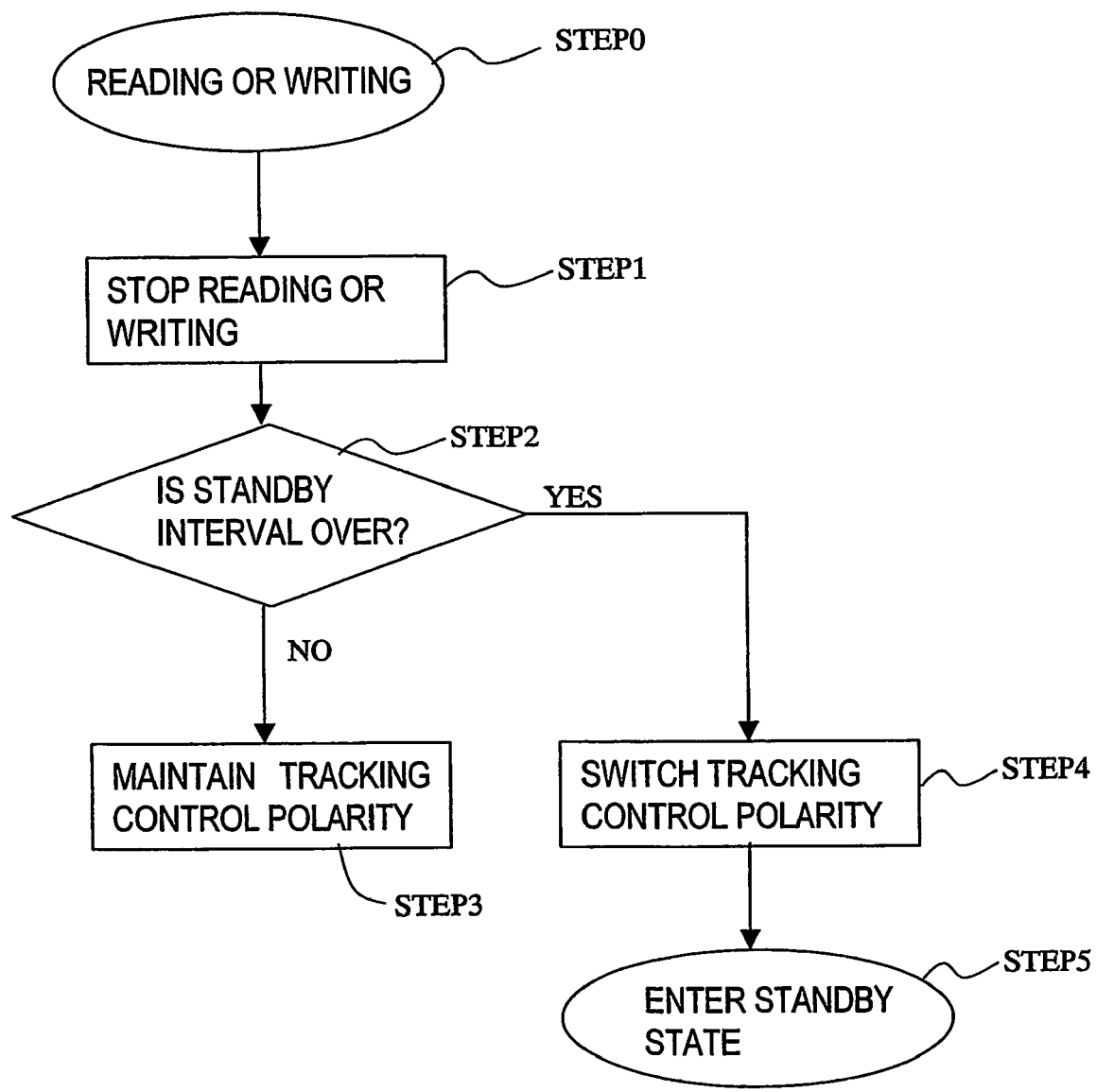

FIG. 13 is a flowchart showing how the tracking control polarity is changed in the second preferred embodiment.

BEST MODE FOR CARRYING OUT THE INVENTION

Hereinafter, preferred embodiments of the present invention will be described with reference to the accompanying drawings.

EMBODIMENT 1

Figure 1:
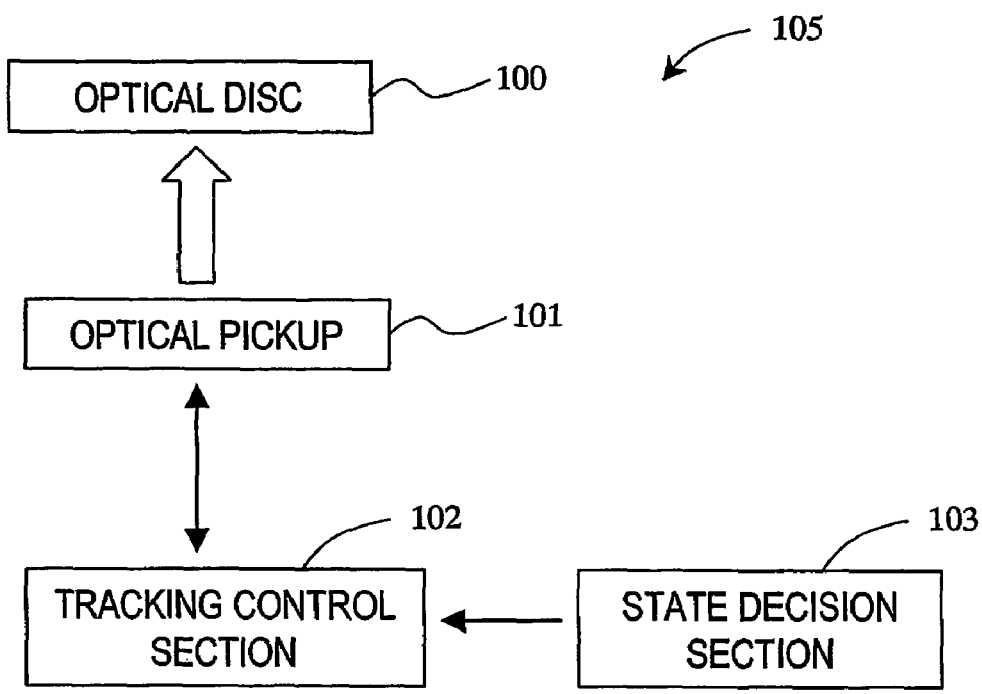
FIG. 1 is a block diagram schematically showing a configuration for an optical disc drive according to a first specific preferred embodiment of the present invention.

First, referring to FIG. 1, schematically shown is a configuration for an optical disc drive 105 according to a first specific preferred embodiment of the present invention. The optical disc drive 105 can read and write data from/on a removable optical disc 100. The optical disc 100 may be a DVD-R, for example, and is preferably a disk storage medium including recording tracks to write data thereon and guide tracks that are provided where no recording tracks are present.

Figure 2:
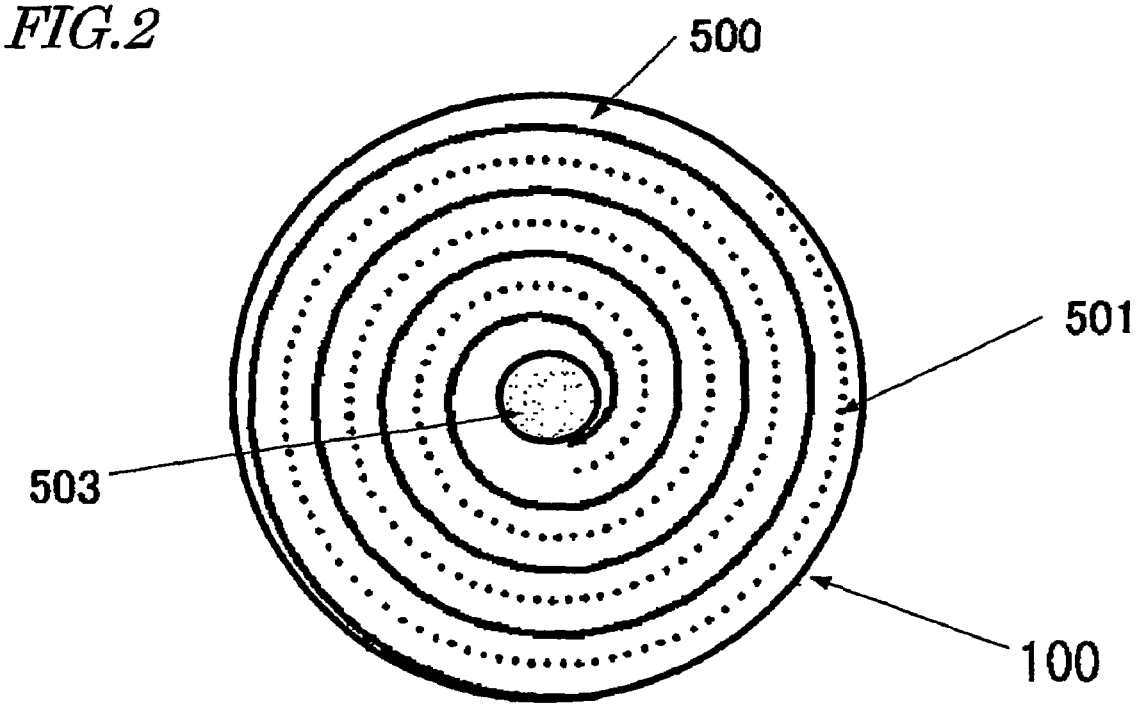
FIG. 2 is a plan view showing a track arrangement on an optical disc to be read from, or written to, by the optical disc drive of the first preferred embodiment.
Figure 3:
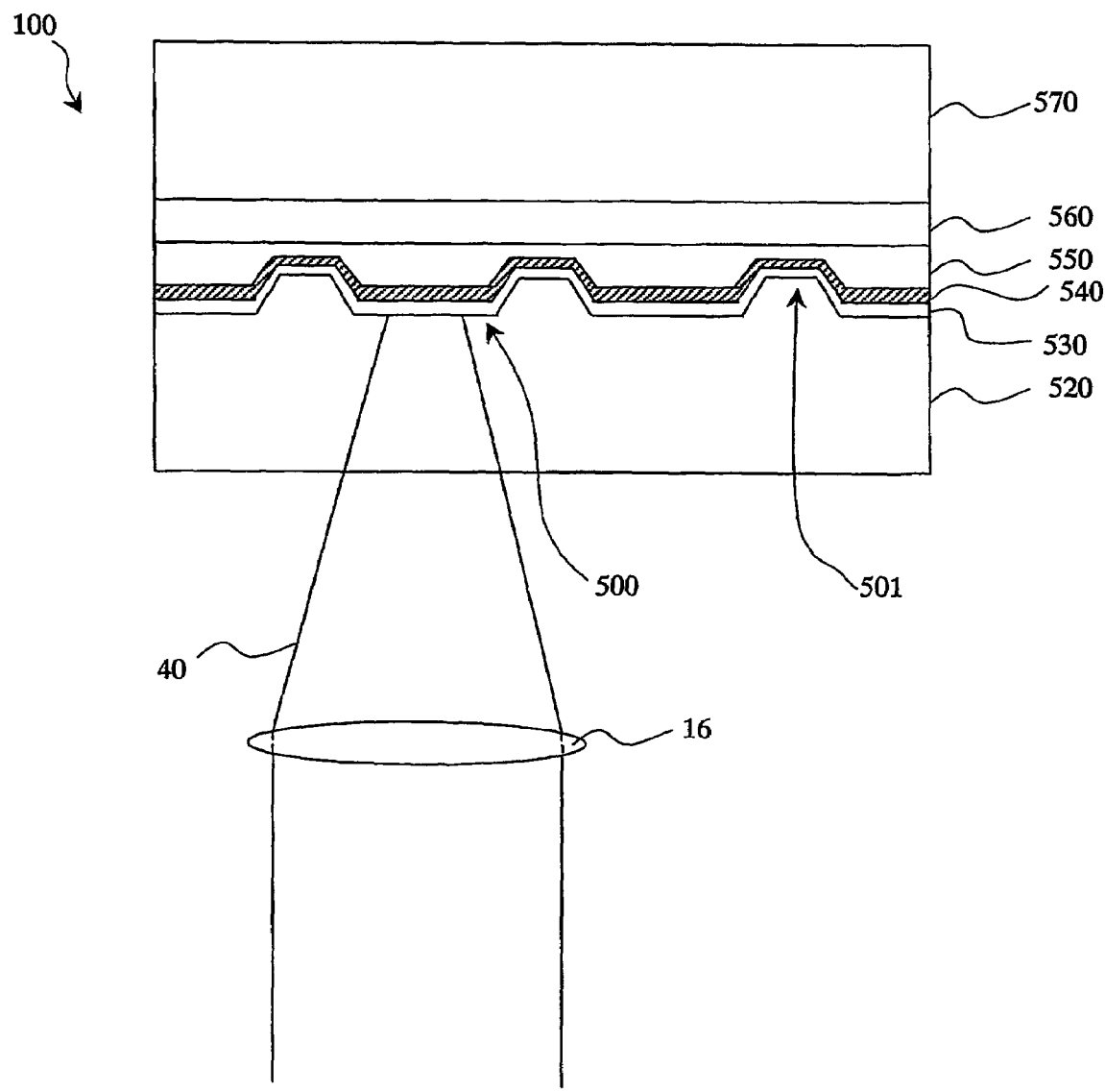
FIG. 3 is a cross-sectional view illustrating a main portion of the optical disc shown in FIG. 2.

FIG. 2 illustrates a planar arrangement of tracks on the optical disc 100, and FIG. 3 schematically illustrates a cross-sectional structure of a portion of the optical disc 100.

As shown in FIG. 2, a disc hole 503 is provided at the center of the optical disc 100. Thus, the optical disc 100 is clamped such that the shaft of a disc motor (not shown) extends through the center of the optical disc 100 (i.e., the disc hole 503). Also, recording tracks 500 and guide tracks 501 are provided on the optical disc 100 as indicated by the solid curve and dashed curve, respectively, so as to extend spirally outward (i.e., from the lead-in area toward the lead-out area of the optical disc 100).

As used herein, the "recording tracks" are tracks for use to write user data thereon, while the "guide tracks" are tracks for use to generate a signal required for a tracking control operation. Optionally, pre-pits may be provided on the guide tracks.

As shown in FIG. 3, the optical disc 100 preferably includes a first substrate 520 with grooves thereon, a recording film 530, a reflective film 540, a protective coating 550, an adhesive layer 560 and a second substrate 570. In the example illustrated in FIG. 2, a portion of the recording film 530, which is located on the recording track 500, is irradiated with a light beam 40 that has been emitted from under the first substrate 520. As viewed upward from a convergent lens 16, the groove (i.e., a concave portion) and land (i.e., a convex portion) of the first substrate 520 look like a land and a groove, respectively. For that reason, each of these terms "land" and "groove" may refer to a totally opposite portion depending on the location of the user's viewpoint. To avoid such confusion, a portion of the first substrate 520 that protrudes toward the convergent lens 16 will be referred to herein as a "groove".

On the optical disc 100 for use in this preferred embodiment, the user data is written on the grooves, not on the lands. Thus, the grooves of the optical disc 100 function as the "recording tracks 500", while the lands thereof function as the "guide tracks 501" for use to generate a tracking signal.

The optical disc 100 having such a configuration is typically a DVD-R or a DVD-RW. However, it is not preferable that the optical disc drive 105 can read or write from/on only optical discs that are compliant with just a single format. Instead, the optical disc drive 105 is preferably compatible with optical discs that are complaint with various formats.

Referring back to FIG. 1, the optical disc drive 105 makes an optical pickup 101 emit a light beam toward, and form a light beam spot on, the optical disc 100 in order to read or write data from/on the optical disc 100. The optical pickup 101 includes a converging optical system for focusing the light beam that has been emitted from the light source inside of the optical pickup 101.

Also, the optical disc drive 105 further includes a tracking control section 102, which controls the converging optical system of the optical pickup 101 such that the light beam spot follows the target track on the optical disc 100 rotating. One of the most important features of the optical disc drive 105 of this preferred embodiment is selectively operating the tracking control section 102 either in a first mode or in a second mode. Specifically, in the first mode, the tracking control section 102 is controlled such that the light beam spot follows the recording tracks on the optical disc 100. In the second mode on the other hand, the tracking control section 102 is controlled such that the light beam spot follows the guide tracks on the optical disc 100.

Hereinafter, it will be briefly described with reference to FIG. 4 how the optical disc drive 105 operates in this preferred embodiment.

First, while the optical disc drive 105 is performing a read or write operation on the optical disc 100 rotating, the tracking control section 102 is performing a tracking operation such that the light beam spot, formed on the optical disc 100 by the light beam that has been emitted from the optical pickup 101, is located right on the desired recording track that is specified by a selected address.

In writing data on the optical disc 100, the power of the light beam is modulated between a relatively high level, at which the reflectivity of the recording film of the optical disc 100 is changeable, and a relatively low level, at which the reflectivity of the recording film is not changeable. In reading data from the optical disc 100 on the other hand, the power of the light beam is decreased and a readout signal is generated by detecting a variation in the reflectance of the recording film of the optical disc 100. Accordingly, during the read operation, the light beam power is adjusted to, and maintained at, a sufficiently low constant level.

Figure 4:
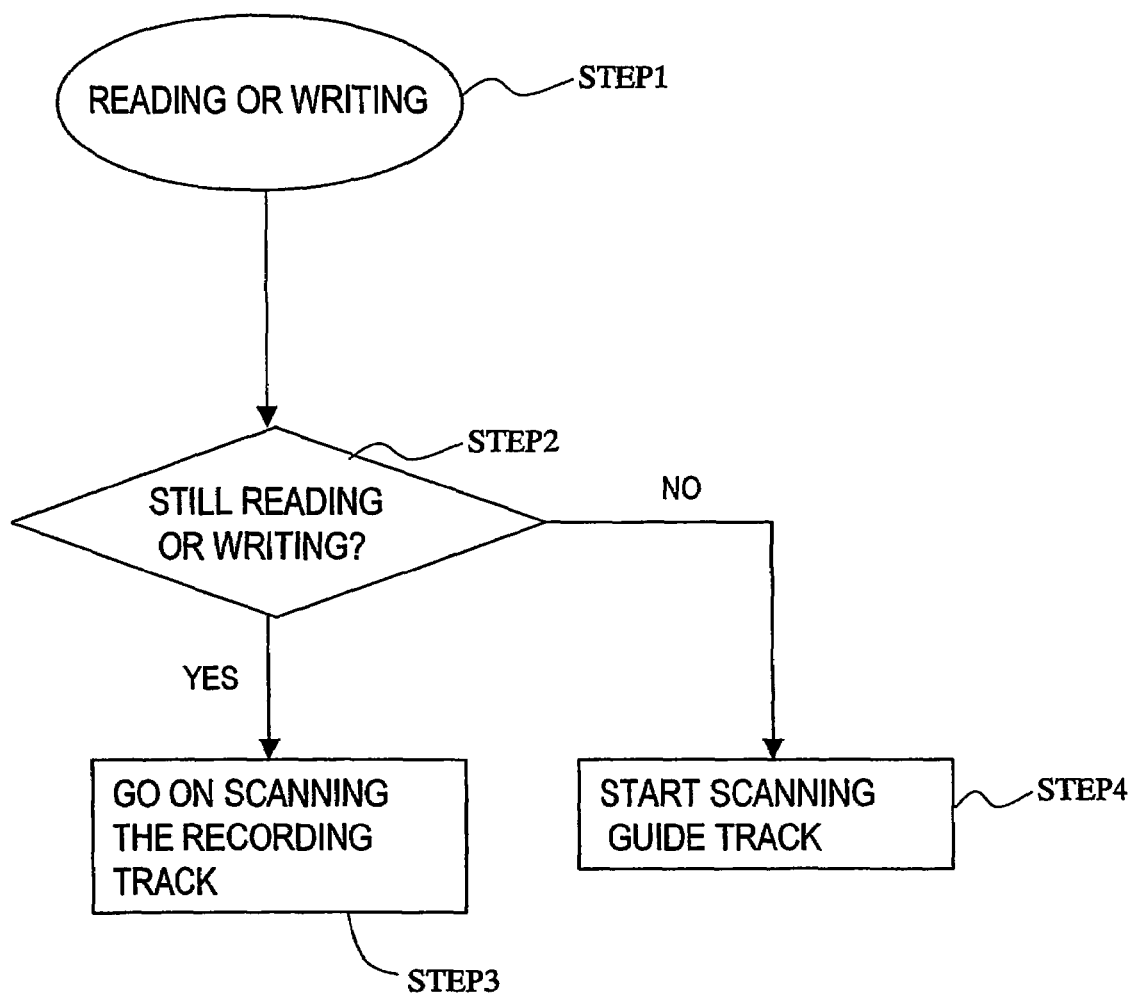
FIG. 4 is a flowchart showing how to change tracking control polarity in the first preferred embodiment.

In Step 1 shown in FIG. 4, the optical disc drive 105 is performing a read operation or a write operation. Next, in Step 2, the state decision section 103 (see FIG. 1) determines whether or not the optical disc drive 105 is still performing a read/write operation. If the answer is YES, then the state decision section 103 does not change the mode of operation of the tracking control section 102 in the next step 3 such that the light beam spot goes on scanning the recording tracks. However, if the answer is NO, the state decision section 103 changes the modes of operation of the tracking control section 102 in the next step 4 such that the light beam spot starts scanning the guide tracks.

By switching the tracks to be followed by the light beam spot from the "recording tracks" into the "guide tracks" in this manner in accordance with the decision that has been made by the state decision section 103, unnecessary exposure of the recording tracks to the light beam can be minimized.

It should be noted that as soon as there arises a need to restart a read or write operation while the guide track is being scanned with the light beam, the state decision section 103 senses the need promptly and switches the modes of operation of the tracking control section 102 such that the recording track starts being scanned with the light beam again.

Hereinafter, the optical disc drive 105 of this preferred embodiment will be described in further detail.

Figure 5:
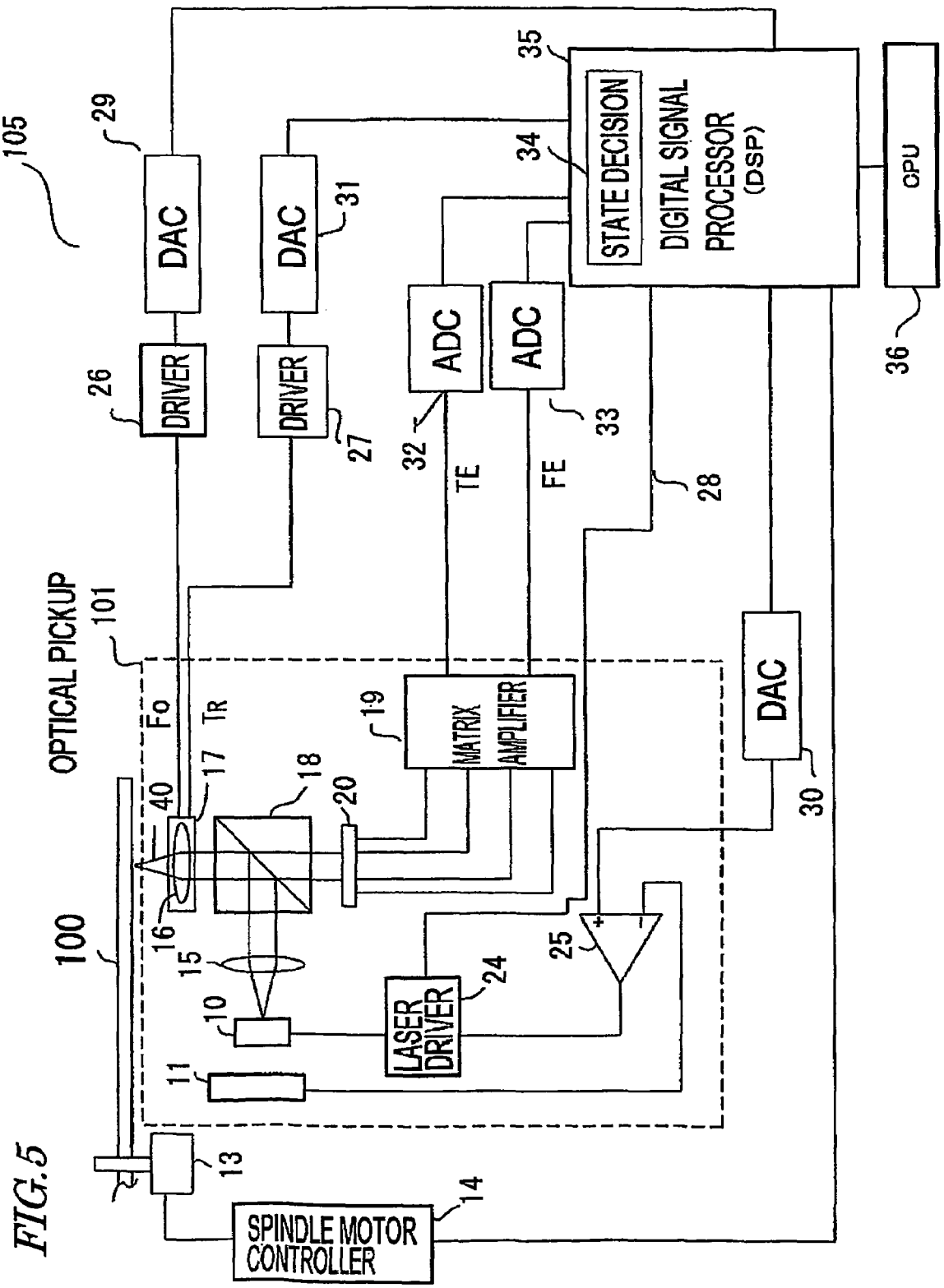
FIG. 5 is a block diagram showing a more detailed configuration for the optical disc drive shown in FIG. 1.

First, referring to FIG. 5, shown is the detailed internal configuration of the optical disc drive 105. As shown in FIG. 5, the optical disc drive 105 includes the optical pickup 101 with a light source 10 and various optical elements such as a coupling lens 15, a polarization beam splitter 18 and a convergent lens 16. The arrangement of this optical pickup 101 will be described below.

The light source 10 included in the optical pickup 10 is typically implemented as a module including at least one semiconductor laser diode, and is driven in response to the output signal of a laser driver 24. To make this optical disc drive 105 conformable to various different standards defined for CDs, DVDs and other optical discs, the light source 10 preferably includes a plurality of semiconductor laser diodes so as to emit laser radiations with mutually different wavelengths. In this preferred embodiment, a semiconductor laser diode that emits a laser radiation with a wavelength of about 650 nm is preferably used as the light source 10.

A portion of the laser radiation that has been emitted from the light source 10 is monitored by a PIN diode 11. The output of the PIN diode 11 is supplied to the inverting input terminal of a differential amplifier 25 and subjected to a negative feedback, thereby controlling the output signal of the laser driver 24. By performing such a control operation, the laser radiation that has been emitted from the light source 10 can have its intensity controlled to a desired value.

The optical output of the light source 10 (i.e., the power or intensity of the laser radiation emitted) changes whether the optical disc drive 105 is reading data or writing data. Also, while the optical disc drive 105 is writing data, the optical output of the light source 10 is further modulated with the data being written on the optical disc 100. It will be described in further detail later exactly how to control the optical output of the light source 10. Instead, the description of the configuration and operation of the optical pickup 101 will be continued for a while.

The laser radiation that has been emitted from the light source 10 is transmitted through the coupling lens 15, polarization beam splitter 18 and convergent lens 16 of the optical pickup 101 so as to be focused as a light beam 40 onto the optical disc 100.

Specifically, the coupling lens 15 collimates the light that has been emitted from the light source 10 and passes the collimated, parallel beam to the polarization beam splitter 18.

Next, the polarization beam splitter 18 reflects the (polarized) light, which has been transmitted through the coupling lens 15, toward the optical disc 100 but transmits the light that has been reflected from the optical disc 100. The light reflected from the optical disc 100 is also polarized light but has a different polarization axis from the light transmitted through the coupling lens 15.

The convergent lens 16 is moved by an actuator 17 along the optical axis of the light beam 40 and controlled such that the light beam 40 is focused right on the recording layer of the optical disc 100. The operation of the actuator 17 is controlled in accordance with signals Fo and Tr that are supplied from drivers 26 and 27, respectively.

The light beam 40 that has been reflected from the optical disc 100 is transmitted through the convergent lens 16 and the polarization beam splitter 18 and then incident onto a photodetector 20. The photodetector 20 may include four divided detecting areas, for example, and converts the intensity of the received light beam 40 into an electric signal. The output electric signal of the photodetector 20 is supplied to a matrix amplifier 19.

Based on the output of the photodetector 20, the matrix amplifier 19 generates a focus error signal FE and a tracking error signal TE. Hereinafter, it will be described with reference to FIGS. 6 and 7 how to generate these signals.

Figure 6:
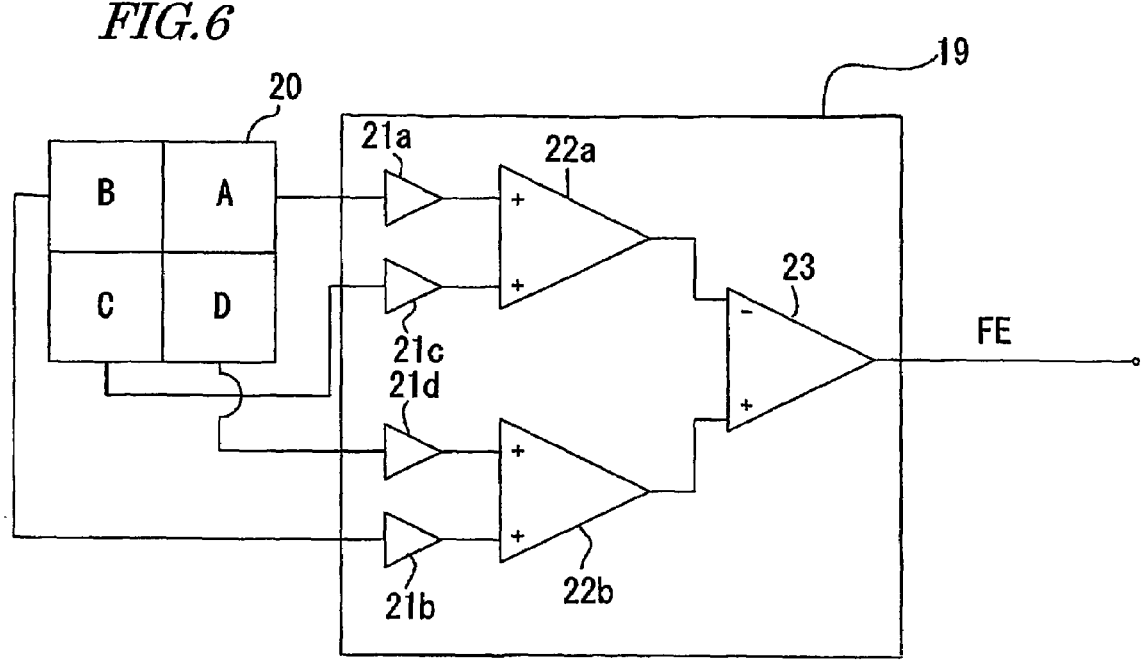
FIG. 6 is a block diagram showing how a focus error signal FE is generated by the photodetector and matrix amplifier of the optical disc drive shown in FIG. 5.

The photodetector 20 of this preferred embodiment includes four divided detecting areas A, B, C and D, which are arranged as shown in FIG. 6. Each of these detecting areas A, B, C and D generates and outputs a current signal representing the intensity of the incident light beam. Next, the resultant four current signals are input to current-to-voltage converting amplifiers 21a, 21b, 21c and 21d, which are provided in the matrix amplifier 19. These four current signals are converted by the amplifiers 21a, 21b, 21c and 21d into respective voltage signals, which are then subjected to arithmetic operations in the matrix amplifier 19. Specifically, the adders 22a and 22b of the matrix amplifier 19 generate two diagonal sum signals, which are then input to, and added up by, a differential amplifier 23, thereby generating the focus error signal FE.

Figure 7:
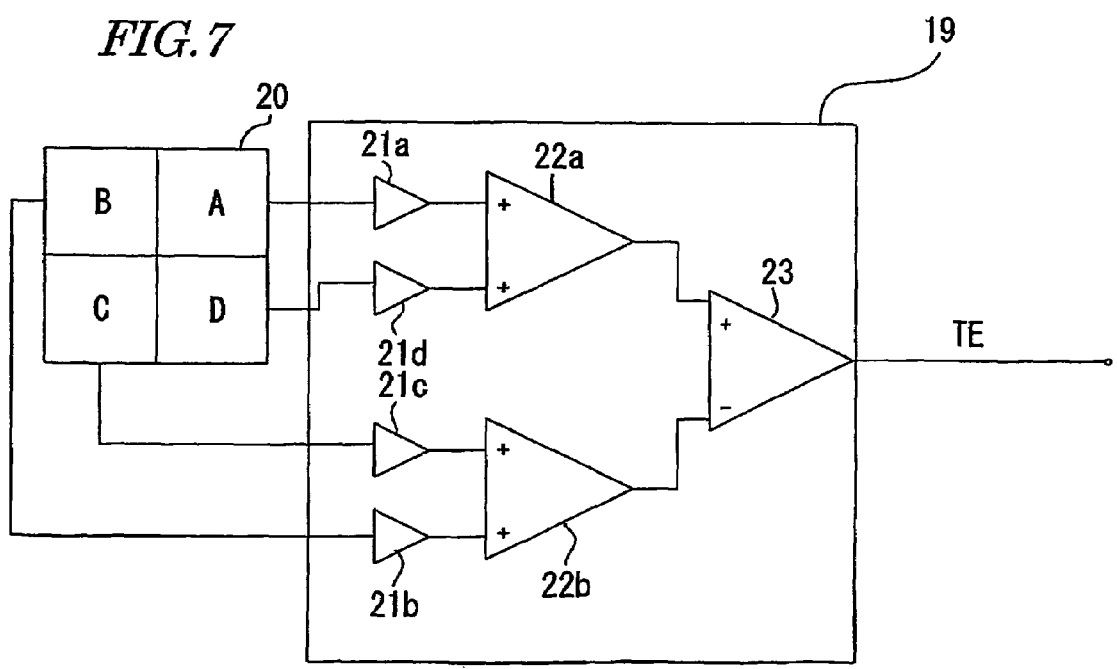
FIG. 7 is a block diagram showing how a tracking error signal TE is generated by the photodetector and matrix amplifier of the optical disc drive shown in FIG. 5.

Meanwhile, the four current signals, which have been output from the detecting areas A, B, C and D of the photodetector 20, are also supplied to, and converted into voltage signals by, another set of current-to-voltage converting amplifiers 21a, 21b, 21c and 21d, which are also provided inside of the matrix amplifier 19 as shown in FIG. 7. Then, the adders 22a and 22b generate two horizontal sum signals, which are subsequently supplied to the differential amplifier 23, thereby generating the tracking error signal TE.

However, the circuit configurations and methods for generating the focus error signal FE and the tracking error signal TE are not limited to the examples shown in FIGS. 6 and 7 but may also be any known configuration and method.

Also, in the preferred embodiment described above, the matrix amplifier 19 is provided inside of the optical pickup 101. Alternatively, some or all of the circuits that make up the matrix amplifier 19 may be provided outside of the optical pickup 101.

Referring back to FIG. 5, the tracking error signal TE and the focus error signal FE that have been generated by the matrix amplifier 19 are supplied to A/D converters 32 and 33, respectively. These signals TE and FE are converted by the A/D converters 32 and 33 into digital signals, which are then supplied to a digital signal processor (DSP) 35.

On receiving the digital focus error signal FE from the A/D converter 33, the DSP 35 carries out digital computations, including additions, delays and multiplications, on the focus error signal FE, thereby compensating for the low-frequency gain of the focus control and performing phase compensation around a gain intersection. A focus control signal Fo, obtained by the DSP 35 through these processes, is output to a driver 26 by way of a D/A converter 29. In response, the driver 26 amplifies the current as represented by the focus control signal Fo and then supplies the resultant amplified control signal to the actuator 17 inside of the optical pickup 101. In accordance with this control signal, the actuator 17 drives the convergent lens 16, thereby performing a focus control such that the focal point of the light beam 40 is located right on the optical disc 100.

On the other hand, the DSP 35 also carries out digital computations, including additions, delays and multiplications, on the tracking error signal TE received from the A/D converter 32, thereby compensating for the low-frequency gain of the tracking control and performing phase compensation around a gain intersection. A tracking control signal TR, obtained by the DSP 35 through these processes, is output to a driver 27 by way of a D/A converter 31. In response, the driver 27 amplifies the current as represented by the tracking control signal Tr and then supplies the resultant amplified control signal to the actuator 17. In accordance with this control signal, the actuator 17 drives the convergent lens 16, thereby performing a tracking control such that the spot of the light beam 40 follows the target track on the optical disc 100.

Furthermore, the DSP 35 outputs a control signal to the non-inverting input terminal of the differential amplifier 25 by way of a D/A converter 30. The differential amplifier 25 is connected to the laser driver 24. Thus, in response to the control signal supplied from the DSP 35, the laser driver 24 controls the optical output of the light source 10 to a predetermined level. The DSP 35 also supplies a control signal to a spindle motor controller 14, thereby getting the optical disc 100 rotated at a predetermined velocity by the motor 13.

The optical disc drive 105 reads or writes data from/on the optical disc 100 in the following manner. First, in accordance with the user's command, a central processing unit (CPU) 36, which controls the overall optical disc drive 105, outputs a read instruction or a write instruction. Next, following the read or write instruction, the optical disc drive 105 performs a seek operation and a tracking operation such that the light beam spot is located right on the target recording track as specified by the given address on the optical disc 100. Then, the optical disc drive 105 performs the operation of reading or writing data from/on the recording track.

In performing a write operation, the DSP 35 outputs a control pulse to the laser driver 24 through a laser driver control line 28. In response to the control pulse, the laser driver 24 drives the laser diode of the light source 10, thereby making the laser diode emit pulsed laser radiation of which the power is high enough to carry out the write operation.

Based on the instruction that has been received from the CPU 36, the state decision section 34 can determine whether or not the optical disc drive 105 is now performing a read/write operation.

It should be noted that the tracking control section 102 shown in FIG. 1 includes the matrix amplifier 19, A/D converters 32 and 33, D/A converter 31 and driver 27 shown in FIG. 5.

Next, the property of the tracking error signal TE will be described in detail with reference to FIG. 8. Portion (a) of FIG. 8 shows the light beam spot 60 on the photodetector 20.

The light beam spot 60 is formed by irradiating the light receiving plane of the photodetector 20 with the light beam that has been reflected from the optical disc 100. Portion (a) of FIG. 8 shows a state in which the center of the light beam spot 60 matches with that of the photodetector 20.

Portion (b) of FIG. 8 illustrates a cross section of the recording track 600, on which the light beam, emitted from over the optical disc 100, is now being focused, and a guide track 601, which is adjacent to the recording track 600. In portion (b) of FIG. 8, the arrow 650 points toward the center (or the inner periphery) of the optical disc 100, while the arrow 651 points toward the outer periphery of the optical disc 100. The light beam spot 61 is formed on the recording track 600 of the optical disc 100 as schematically shown in portion (b) of FIG. 8.

Portion (c) of FIG. 8 is a graph showing a relationship between the center of the light beam spot on the optical disc 100 (as the abscissa) and the tracking error signal TE (as the ordinate). In this graph, the center of the recording track 600 is identified by the reference numeral 641, while the center of the adjacent guide track is identified by the reference numeral 642.

While the light beam spot 61 on the optical disc 100 is following the center 641 of the recording track 600, the light beam spot 60 on the photodetector 20 is evenly distributed over the four detecting areas A, B, C and D. Accordingly, the tracking error signal TE, obtained by the circuits shown in FIG. 7, has a zero level. Such a state is indicated by the point A in portion (c) of FIG. 8.

However, if the light beam spot 61 on the optical disc 100 has shifted from the center 641 of the recording track 600 either inward (i.e., in the direction 650) or outward (i.e., in the direction 651), then the level of the tracking error signal TE changes as shown in portion (c) of FIG. 8. When the light beam spot 61 is located on the center 642 of the adjacent guide track 601, the tracking error signal TE also has the zero level as in the situation where the light beam spot 61 is located on the center 641 of the recording track 600. Also, the level of the tracking error signal TE is either maximized or minimized at the boundary between the recording track 600 and the guide track 601.

FIG. 9 shows the waveform of the tracking error signal TE to be obtained while the light beam spot on the optical disc 100 is going across a number of tracks. Specifically, portion (a) of FIG. 9 shows a cross section of the recording tracks A, B and C and guide tracks A and B. As shown in portion (b) of FIG. 9, the level of the tracking error signal TE becomes substantially equal to zero when the light beam spot is located at any of the centers 710, 711, 712, 713 and 714 of the recording tracks A through D and guide tracks A and B.

For example, when the light beam spot is located at the center 712 of the recording track B, the tracking error signal TE has the zero level. However, since the optical disc 100 is rotating, the light beam spot may slightly shift from the center 712 of the recording track B. Even so, if the tracking control is on, the location of the light beam spot is controlled such that the level of the tracking error signal TE becomes equal to zero again. As a result, the shift of the light beam spot from the center 712 of the recording track B can be reduced to approximately 1/100 of the track pitch. Such a tracking control is temporarily suspended during a seek operation but is continuously carried out during a read or write operation.

More specifically, if the light beam spot has shifted inward (i.e., in the direction indicated by the arrow 750 in portion (a) of FIG. 9) from the center 712 of the recording track B, then the tracking error signal TE comes to have positive polarity and increases its absolute value as shown in portion (b) of FIG. 9. Conversely, if the light beam spot has shifted outward (i.e., in the direction indicated by the arrow 751 in portion (a) of FIG. 9) from the center 712 of the recording track B, then the tracking error signal TE comes to have negative polarity and also increases its absolute value as shown in portion (b) of FIG. 9.

Accordingly, if the tracking error signal TE has a positive level while the tracking operation is being carried out to make the light beam spot follow the recording track B, then the optical pickup 101 should be driven such that the light beam spot is shifted outward (i.e., in the direction indicated by the arrow 751 in portion (a) of FIG. 9). On the other hand, if the tracking error signal TE has a negative level during the tracking operation, then the optical pickup 101 should be driven such that the light beam spot is shifted inward (i.e., in the direction indicated by the arrow 750 in portion (a) of FIG. 9).

As described above, the optical disc drive 105 of this preferred embodiment can switch the modes of operation of the tracking control section 102 shown in FIG. 1 between the first mode (i.e., recording track scanning mode) and the second mode (i.e., guide track scanning mode). Before this switching is described in detail, the tracking control in the second mode will be described.

First, suppose the light beam spot is now following the guide track B. In that case, if the light beam spot has shifted inward (i.e., in the direction indicated by the arrow 750 in portion (a) of FIG. 9) from the center 713 of the guide track B, then the tracking error signal TE comes to have negative polarity and increases its absolute value as shown in portion (b) of FIG. 9. Conversely, if the light beam spot has shifted outward (i.e., in the direction indicated by the arrow 751 in portion (a) of FIG. 9) from the center 713 of the guide track B, then the tracking error signal TE comes to have positive polarity and also increases its absolute value as shown in portion (b) of FIG. 9.

Accordingly, if the tracking error signal TE has a negative level while the tracking operation is being carried out to make the light beam spot follow the guide track B, then the optical pickup 101 should be driven such that the light beam spot is shifted outward (i.e., in the direction indicated by the arrow 751 in portion (a) of FIG. 9). On the other hand, if the tracking error signal TE has a positive level during the tracking operation, then the optical pickup 101 should be driven such that the light beam spot is shifted inward (i.e., in the direction indicated by the arrow 750 in portion (a) of FIG. 9).

In this manner, the light beam spot shifting direction that is defined in one of the two modes with respect to a tracking error signal TE with the positive or negative polarity is opposite to that defined in the other mode with respect to the tracking error signal TE with the same polarity. For that reason, these two modes can be switched easily just by inverting the polarity of the control signal to be output from the tracking control section. Specifically, the modes may be switched by inverting (1) the conversion polarity of the A/D converter 32, (2) the control polarity through digital computation processing by the DSP 35 or (3) the conversion polarity of the D/A converter 31. In this preferred embodiment, the control polarity is inverted through the digital computation processing done by the DSP 35.

It should be noted that when the light beam spot is made to start following a guide track by switching the modes of the tracking control, the guide track does not have to be adjacent to the recording track that the light beam spot has just stopped scanning.

Next, it will be described with reference to FIG. 10 how to switch the modes of operation. Portions (a), (b) and (c) of FIG. 10 show the output of the state decision section, the polarity of the tracking control and the track to be scanned, respectively.

While the optical disc drive is performing a read or write operation, the output of the state decision section has High (H) level. On the other hand, in a standby state in which the optical disc drive is performing no read or write operation, the output of the state decision section has Low (L) level. The polarity of the tracking control switches according to the output of the state decision section. Specifically, if the output of the state decision section is High (H), the tracking control polarity is positive (+) and the light beam spot is located on the recording track.

Next, after the output of the state decision section has changed from High (H) into Low (L), the tracking control polarity will go negative (−) and the light beam spot will start following the guide tracks. It takes a polarity switching time A of about 1 millisecond to about 5 milliseconds to switch the polarity of the tracking control.

Subsequently, when the optical disc drive returns from the standby state to the read/write state, the output of the state decision section will change from Low (L) into High (H). In response, the polarity of the tracking control will change from negative into positive and the light beam spot will start following the recording tracks again. It also takes a polarity switching time B of about 1 millisecond to about 5 milliseconds to switch the polarity of the tracking control.

In this manner, while the optical disc drive is performing no read or write operation, the light beam spot is located on the guide track, thereby preventing portions of the recording film on the recording tracks from being exposed to unnecessary light.

It should be noted that the polarity of the tracking control can be switched in a very short time (e.g., 1 μs) by specially designing the circuit configuration of the optical disc drive or the software to be installed therein.

In the optical disc including spiral tracks as shown in FIG. 2, if the light beam spot goes on scanning the same guide track even after the optical disc has made one rotation, then the light beam spot gradually shifts either inward or outward.

However, it is also possible to fix the light beam spot at substantially the same location in the disc radial direction. Hereinafter, it will be described with reference to FIG. 9 how the light beam spot may be fixed.

While the optical disc drive is reading or writing data from/on the recording track B, the light beam spot is following the center 712 of the recording track B. If the optical disc drive is instructed to change from the read/write state into the standby state during this period, the modes of tracking control are switched. In this case, suppose the light beam spot needs to start scanning the center 711 of the adjacent guide track A, for example. However, if the data stored on the optical disc 100 are sequentially arranged outward (i.e., from the inner periphery toward the outer periphery) along the recording tracks, the light beam spot will be located on the center 713 of the opposite guide track B when the optical disc 100 has made one rotation. In that case, however, the processing of returning the light beam spot toward the guide track A across the guide track B may be performed every time the optical disc 100 makes one rotation.

It should be noted that the light beam spot may be returned to the guide track A even after the optical disc 100 has made more than one rotation. For example, after the optical disc 100 has made a number N of rotations (where N is an integer that is equal to or greater than two), the light beam spot may be moved inward across approximately the same number N of recording tracks. Alternatively, when the optical disc 100 has made the number N of rotations, the light beam spot may be held at the disc radial location. In that case, every time the optical disc has made a number n of rotations (where n is an integer that is greater than one and smaller than N), the light beam spot may be moved inward.

The light beam spot may be held on any guide track (i.e., any disc radial location) on the rotating optical disc. If the address of the recording track to be sought when the optical disc drive resumes a read/write operation after the standby state is complete can be expected, then the light beam spot may be located on a guide track that is close to the recording track with the expected address.

It should be noted that while the light beam spot is following any guide track, no address information can normally be read from the optical disc. Accordingly, if the light beam spot is following guide tracks for a long time after the first mode has been switched into the second mode, the disc radial location of the light beam spot changes with the rotational velocity of the optical disc.

Also, if the light beam spot has crossed recording tracks (i.e., if the optical disc drive has performed a seek operation or a track jump operation) in the second mode, then the disc radial location of the light beam spot may be determined by the number of recording tracks crossed and the rotational velocity of the optical disc.

It should be noted that the rotational velocity of the optical disc can be obtained from the number of revolutions of the disc motor to rotate the optical disc thereon. The number of revolutions of the disc motor can be detected highly accurately. Accordingly, if the number of recording tracks that the light beam spot has crossed is counted, then the location of the light beam spot can also be detected highly accurately after the first mode has been switched into the second mode.

The optical disc drive of the preferred embodiment described above does not expose the recording tracks to any laser radiation while performing no read or write operation. As a result, the weak-radiation-induced deterioration of the recording film can be reduced significantly.

EMBODIMENT 2

Next, an optical disc drive according to a second specific preferred embodiment of the present invention will be described with reference to FIGS. 11 through 13. The optical disc drive of this second preferred embodiment has the same configuration as the optical disc drive of the first preferred embodiment described above except that the DSP 35 of the second preferred embodiment performs additional functions. Thus, each component of the optical disc drive shown in FIG. 11, having substantially the same function as the counterpart shown in FIG. 5, is identified by the same reference numeral and the description thereof will be omitted herein.

First, referring to FIG. 11, the DSP 35 of the optical disc drive 900 of the second preferred embodiment functions as not only the state decision section 34 for determining whether or not the optical disc drive 900 is performing a read/write operation but also as a standby interval clock 37 for measuring the length of a standby interval, i.e., how much time has passed since the optical disc drive 900 got ready to enter the standby state.

The standby interval clock 37, implemented by the DSP 35, starts clocking the standby interval when the optical disc drive 900 stops the read or write operation, and will change the output level thereof when the length of the interval exceeds a predefined length. In accordance with the output level of the standby interval clock 37, the optical disc drive 900 switches the control polarity of the tracking control section. Hereinafter, this point will be described in detail with reference to FIG. 12.

Portions (a), (b), (c) and (d) of FIG. 12 show the output of the state decision section, the output of the standby interval clock, the polarity of the tracking control, and the track to be scanned, respectively.

While the optical disc drive is in the read/write state, the output of the state decision section is High (H). On the other hand, while the optical disc drive is not in the read/write state but in the standby state, the output of the state decision section is Low (L).

In the first preferred embodiment described above, after the output of the state decision section has changed from High (H) into Low (L), the polarity of the tracking control is quickly switched from positive (+) into negative (−). In this second preferred embodiment, however, it is not until the length of the standby interval as measured by the standby interval clock exceeds a predetermined length that the polarity of the tracking control is switched from positive (+) into negative (−). If the next read/write operation starts before the length of the standby interval measured exceeds the predetermined length, then the polarity of the tracking control will not be switched.

It should be noted that as soon as there arises a need to start the next read or write operation during the standby interval, the standby interval clock stops clocking the standby interval so as to allow the optical disc drive to start the read or write operation quickly.

FIG. 13 shows the flow of the process of measuring the length of the standby interval.

First, in Step 0, the optical disc drive 900 is now performing a read or write operation. Next, in Step 1, when the optical disc drive 900 stops the read or write operation, the standby interval clock starts clocking the standby interval. Subsequently, in Step 2, it is determined whether or not the length of the standby interval measured has exceeded a reference value. If the answer is NO, then the polarity of the tracking control is maintained in the next step 3. On the other hand, if the answer is YES, then the standby interval clock stops measuring the interval and the polarity of the tracking control is switched in the next step 4. On switching the polarity of the tracking control, the light beam spot moves from the recording track onto a guide track, thus making the optical disc drive 900 enter the standby state in the next step 5.

The standby interval to be measured by the standby interval clock 37 may have a length of about 30 milliseconds.

If a read error or a write error has occurred while the optical disc drive is performing a read or write operation on a specified address on a recording track, then the optical disc drive must perform the read or write operation on the same address all over again. In that case, although the output of the state decision section changes from High (H) into Low (L), the polarity of the tracking control should not be switched immediately. Instead, if such a read or write error has occurred, the switching of the tracking control polarity is preferably postponed until the read or write operation is completed for the second time. Accordingly, the reference value representing the standby interval described above is preferably longer than the time it takes for the optical disc to make one rotation. Then, it is possible to prevent the tracking control polarity from being switched unnecessarily while the read or write operation is being carried out on the same address for the second time. As a result, the tracking operation can be carried out even more smoothly.

In a situation where the optical disc drive is performing a read or write operation on an area of the optical disc that is rather close to the outer edge thereof, if the reference value is defined too long, then the light beam spot may reach the outer edge of the optical disc before the tracking control polarity is switched. To avoid such a situation, while the optical disc drive is performing a read or write operation on an area of the optical disc that is rather close to the outer edge thereof, the reference value is preferably defined to be shorter than the amount of time it takes to scan the remaining recording tracks on the optical disc.

INDUSTRIAL APPLICABILITY

According to various preferred embodiments of the present invention described above, while no read or write operation is being performed, the light beam spot is located on a guide track on which no data is written. Thus, an optical disc drive, which can perform a read operation constantly by minimizing the weak-radiation-induced deterioration of the recording film, and a method for controlling such an optical disc drive are provided.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

The invention claimed is:

1. An optical disc drive for use to read and write data from/on an optical disc, the optical disc including recording tracks to write data thereon and guide tracks for guiding a light beam, the optical disc drive comprising:

an optical pickup including a converging optical system, the converging optical system being used to focus the light beam, and form a spot of the light beam, on the optical disc for the purpose of reading or writing the data from/on the optical disc;

a tracking control section for controlling the converging optical system of the optical pickup such that the spot of the light beam follows a selected one of the tracks on the optical disc rotating; and a control unit for selectively operating the tracking control section either in a first mode or in a second mode, wherein in the first mode, the tracking control section makes the light beam spot follow the recording tracks, and wherein in the second mode, the tracking control section makes the light beam spot follow the guide tracks.

2. The optical disc drive of claim 1, wherein the optical disc includes lands and grooves that extend spirally, and wherein the recording tracks are defined on the lands or the grooves and the guide tracks are defined on the grooves or the lands.

3. The optical disc drive of claim 1, wherein while the tracking control section is operating in the first mode, the optical disc drive reads or writes the data from/on the optical disc, and wherein while the tracking control section is operating in the second mode, the optical disc drive neither reads nor writes the data from/on the optical disc.

4. The optical disc drive of claim 1, wherein the tracking control section is switched from the first mode into the second mode by changing control polarity of the tracking control section.

5. The optical disc drive of claim 4, wherein the control polarity of the tracking control section is changed by switching the polarity of a signal to be input to the tracking control section.

6. The optical disc drive of claim 1, wherein the optical pickup further includes: a photodetector, which receives the light beam that has been reflected from the optical disc and which outputs an electric signal representing an intensity distribution of the light beam; and an actuator for driving the converging optical system, and wherein the tracking control section includes: means for generating a tracking error signal in accordance with the electric signal that has been supplied from the photodetector; and a driver for driving the actuator of the optical pickup in response to a signal output from the control unit.

7. The optical disc drive of claim 6, wherein the control unit controls switching of the tracking control section between the first and second modes in accordance with an operation state of the optical disc drive.

8. The optical disc drive of claim 7, wherein the control unit inverts the polarity of an output signal of the means for generating the tracking error signal or the polarity of an output signal of the driver, thereby switching the tracking control section between the first and second modes.

9. The optical disc drive of claim 7, wherein at least a portion of the control unit functions as a state decision section for determining whether or not the optical disc drive is performing a read/write operation, and wherein in accordance with a decision that has been made by the state decision section, the control unit switches the tracking control section between the first and second modes.

10. The optical disc drive of claim 6, wherein the control unit is a digital signal processor.

11. The optical disc drive of claim 1, further comprising a standby interval clock for measuring the length of a standby interval in which the tracking control section is operating in the first mode but the optical disc drive has already stopped reading or writing the data, wherein when the length of the standby interval that has been measured by the standby interval clock exceeds a predefined value, the tracking control section switches from the first mode into the second mode.

12. The optical disc drive of claim 11, wherein the predefined value is at least equal to the amount of time it takes for the optical disc to make one rotation and is shorter than the amount of time it takes to read or write the data from/on remaining ones of the recording tracks on the optical disc.

13. A method for controlling an optical disc drive, the optical disc drive being used to read and write data from/on an optical disc, the optical disc including recording tracks to write data thereon and guide tracks for guiding a light beam, the optical disc drive comprising:

an optical pickup including a converging optical system, the converging optical system being used to focus the light beam, and form a spot of the light beam, on the optical disc for the purpose of reading or writing the data from/on the optical disc;

a tracking control section for controlling the converging optical system of the optical pickup such that the spot of the light beam follows a selected one of the tracks on the optical disc rotating; and a control unit for operating the tracking control section in a selected mode, wherein the method comprising the steps of:

(a) controlling the tracking control section such that the light beam spot follows the recording tracks;

(b) controlling the tracking control section such that the light beam spot follows the guide tracks; and (c) switching modes of operation of the tracking control section.

14. The method of claim 13, wherein the optical disc includes lands and grooves that extend spirally, and wherein the recording tracks are defined on the lands or the grooves and the guide tracks are defined on the grooves or the lands.

15. The method of claim 13, wherein the step (a) includes the step of reading or writing the data from/on the optical disc, and wherein the step (b) includes the step of reading or writing no data from/on the optical disc.

16. The method of claim 13, wherein the step (c) includes the step of changing control polarity of the tracking control section.

17. The method of claim 16, wherein the step of changing the control polarity of the tracking control section includes the step of switching the polarity of a signal to be input to the tracking control section.

18. The method of claim 13, wherein the optical pickup further includes: a photodetector, which receives the light beam that has been reflected from the optical disc and which outputs an electric signal representing an intensity distribution of the light beam; and an actuator for driving the converging optical system, and wherein the tracking control section includes: means for generating a tracking error signal in accordance with the electric signal that has been supplied from the photodetector; and a driver for driving the actuator of the optical pickup in response to a signal output from the control unit.

19. The method of claim 18, wherein the step (c) includes the step of getting the control polarity of the tracking control section inverted by the control unit in accordance with an operation state of the optical disc drive.

20. The method of claim 19, wherein the step (c) includes the step of inverting the polarity of an output signal of the means for generating the tracking error signal or the polarity of an output signal of the driver.

21. The method of claim 13, wherein the step (a) includes the step of measuring the length of a standby interval in which the optical disc drive has already stopped reading or writing the data, wherein the step (c) is carried out when the length of the standby interval exceeds a predefined value.

22. The method of claim 21, wherein the predefined value is at least equal to the amount of time it takes for the optical disc to make one rotation and is shorter than the amount of time it takes to read or write the data from/on remaining ones of the recording tracks on the optical disc.

23. An electronic apparatus comprising an optical disc drive for use to read and write data from/on an optical disc, the optical disc including recording tracks to write data thereon and guide tracks for guiding a light beam, the optical disc drive comprising:

an optical pickup including a converging optical system, the converging optical system being used to focus the light beam, and form a spot of the light beam, on the optical disc for the purpose of reading or writing the data from/on the optical disc;

a tracking control section for controlling the converging optical system of the optical pickup such that the spot of the light beam follows a selected one of the tracks on the optical disc rotating; and a control unit for selectively operating the tracking control section either in a first mode or in a second mode, wherein in the first mode, the tracking control section makes the light beam spot follow the recording tracks, and wherein in the second mode, the tracking control section makes the light beam spot follow the guide tracks.

* * * * *